United States Patent [19]

Berg

[11] 4,365,838
[45] Dec. 28, 1982

[54] INERTIA SEAT BACK LOCK

[75] Inventor: Alan D. Berg, Oxford, Mich.

[73] Assignee: General Motors Corporation, Detroit, Mich.

[21] Appl. No.: 202,493

[22] Filed: Oct. 31, 1980

[51] Int. Cl.³ ............................................ B60N 1/02
[52] U.S. Cl. ................................... 297/379; 297/216
[58] Field of Search ........................ 297/216, 379, 378

[56] References Cited

U.S. PATENT DOCUMENTS 2,732,003  1/1956  Williams.
2,873,794  2/1959  Leslie et al..
4,118,067 10/1978  Tanaka ................................ 297/379
4,305,615 12/1981  Osterhold .......................... 297/379

FOREIGN PATENT DOCUMENTS 2641587  3/1978  Fed. Rep. of Germany ...... 297/379

Primary Examiner—William E. Lyddane
Attorney, Agent, or Firm—William A. Schuetz

[57] ABSTRACT

A latching mechanism for latching a tiltable seat back rest to a seat is disclosed. The latching mechanism is operable to normally latch the seat back rest in its fully upright position, allow slow forward tilting movement of the seat back without manual manipulation of the latch mechanism and prevent significant forward tilting movement of the seat back rest upon being subjected to rapid deceleration forces. The latching mechanism is constructed and arranged such that it is operable to latch the seat back rest in an upright position slightly forwardly of its fully upright position, such as could occur when the seat back rest engages cargo loaded in a cargo area behind the seat back rest.

4 Claims, 4 Drawing Figures

INERTIA SEAT BACK LOCK

The present invention relates to a seat assembly for vehicles, and more particularly to a novel latching mechanism for seats having tiltable back rests and which is operable to normally latch the back rest in an upright position, to allow slow forward tilting movement of the seat back without manual manipulation of the latch mechanism, and to prevent significant forward tilting movement upon rapid deceleration of the vehicle.

Known latching mechanisms for tiltable seat back rests have heretofore been provided. Some of these latching mechanisms have also been operable to normally latch the back rest in an upright position, to allow slow forward tilting movement of the seat back, and to prevent tilting forward movement of the seat back upon rapid deceleration of the vehicle. Such latching mechanisms are disclosed in U.S. Pat. No. 2,873,794, assigned to the same assignee of the present invention.

A disadvantage of these known latching mechanisms is that they will not function to operatively latch the seat back rest if the latter is not in its fully upright position. This can occur, for example, when cargo in a cargo area located behind the seat back rest prevents movement of the latter to its fully upright position. When this occurs, the seat back rest is in an upright position located forwardly of its normally upright position and thus, the latching mechanism will not function to latch the seat back rest upon rapid deceleration of the vehicle.

The present invention provides a novel latching mechanism of the character described above, but which is also operable to latch the seat back rest in an upright position when it is located slightly forwardly of its upright position.

Accordingly, an object of the present invention is to provide a novel latching mechanism for a tiltable seat back rest and which is operable to latch the seat back rest in its fully upright position or a position slightly forwardly of its fully upright position, which allows slow forward tilting movement of the seat back when it is desired to put the seat back rest down, and which prevents significant forward tilting movement of the seat back rest upon rapid deceleration of the vehicle.

A further object of the present invention is to provide a novel latching mechanism of the character described in the preceding object and which is of a relatively simple construction comprising a minimum number of parts and which is substantially noiseless when latching the seat in its upright position.

Another object of the present invention is to provide a novel latching mechanism of the character described in the preceding objects and in which the latching mechanism is carried by a housing means secured to a vehicle seat and in which the housing means also functions as a stop against which the seat back rest rests when in its fully upright position.

A more specific object of the present invention is to provide a novel latching mechanism for a seat assembly for an automotive vehicle having a seat and a seat back rest which is pivotally supported for movement between a fully upright position and a forward position in which it generally overlies the seat, and in which the latching mechanism comprises a striker means carried by the back rest and movable through a given path, and a pivotally supported, inertia responsive latch means having a latch at one end of a cam follower means spaced from the latch, and wherein the latch means is gravity biased toward an unlatched position but normally held against its gravity bias in a latched position by the striker means engaging the cam follower means so that the latch is disposed within the path of movement of the striker means when the seat back is in an upright position, and wherein the latch means due to inertia forces is maintained in its latched position so that the latch means will engage the striker means when the vehicle seat assembly is subject to rapid deceleration forces so that further forward movement of the seat back is prevented, and whereby the cam follower means extends along the path of movement of the striker means an extent such that the striker means will hold the latch means in its latched position when the seat back is both in its fully upright position as well as when the seat back is in an upright position slightly forwardly of its fully upright position.

The present invention further resides in various novel constructions and arrangement of parts, and further objects, novel characteristics and advantages of the present invention will be apparent to those skilled in the art to which it relates and from the following detailed description of the illustrated, preferred embodiment hereof made with reference to the accompanying drawings forming a part of this specification and in which similar reference numerals are employed to designate corresponding parts throughout the several views, and in which.

The present invention provides a novel latching mechanism for a vehicle seat assembly having a seat or seat unit and a tiltable back rest or back rest unit. Although the novel latching mechanism could be used with various kinds of seat assemblies having a tiltable back rest unit, it is particularly suitable for use with vehicles, such as light trucks or vans, which contain a cargo area immediately behind the seat. The seat back rest is tiltable to a forward position in which it overlies the seat so to permit access to the cargo area.

Figure 1:
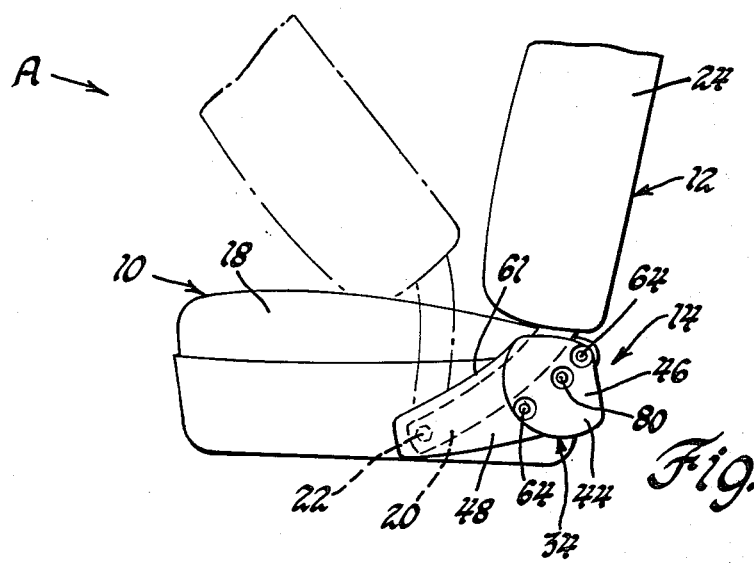
FIG. 1 is a partial elevational view of a vehicle seat assembly incorporating the novel latching mechanism of the present invention.

Referring to FIG. 1, a vehicle seat assembly A is there shown which comprises, in general, a seat or seat unit 10, a tiltable back rest or back rest unit 12 and a latching mechanism 14 which is operable to normally latch the back rest in an upright position, as shown by the solid lines in FIG. 1, which allows slow forward tilting movement of the seat back unit without manual manipulation of the latching mechanism 14 to enable the seat back rest 12 to be moved toward a forward position in which it overlies the seat 10, as shown by the phantom lines in FIG. 1 and which is operable to prevent significant forward tilting movement of the seat back rest 12 upon rapid deceleration of the seat assembly A, such as occurs when a vehicles's brakes are suddenly applied.

The seat or seat unit 10 comprises a suitable seat frame 16 which is adapted to be mounted on the vehicle floor and a seat cushion 18 supported by the seat frame 16. The seat frame 16 includes spaced vertically extending sides 19 (only one of which is shown).

The seat back or seat back unit 12 comprises a pair of spaced hinge arms 20 (only one of which is shown) which are pivotally supported at their lower ends on the sides 19 of the seat frame 16 via pivot pin means 22. The hinge arms 20 support a suitable seat back cushion 24.

The seat back 12 is tiltable or movable from a fully upright position, as shown in the solid lines in FIG. 1, to a forward position in which the seat back 12 overlies the cushion 18 of the seat unit 10, as shown by the phantom lines in FIG. 1. During this movement, the hinge arms 20 pivot about the axis of the pivot pin means 22.

The seat back 12 is normally latched in its fully upright position, as shown by the solid lines in FIG. 1, by the novel latching mechanism 14. The latching mechanism 14 comprises a striker means 30 carried by the seat back 12 and a latch lever means 32 pivotally supported by a housing 34 and which is operable to normally latch seat back 12 in its fully upright position. The striker means 30 comprises a pin 36 which is suitably secured to the hinge arm 20 and which extends transversely thereof. The striker pin 36 is movable in unison with the hinge arm 20 through a given arcuate path, as indicated by reference numeral 38.

The housing 34 comprises a metal base plate 40 which is welded or otherwise suitably secured to the side 19 of the seat frame 16. The housing 34 also includes a cover 44 made from a suitable plastic material and which is secured to the base plate 40. The cover 44 comprises a cup shaped portion 46 and a boot portion 48. The cup shaped portion 46 includes an outer wall 50 spaced from the base plate 40 and an integral circumferentially extending side wall 52 disposed between the outer wall 50 and the base plate 40. The walls 50 and 52 along with base plate 40 define a compartment 56.

The boot portion 48 of the housing 34 is integral with the cup shaped portion 46 and forms a lateral extension to the cup shaped portion 46, but at a lesser depth. The boot portion 48 is merely decorative and hides the lower ends of the hinge arms 20 when the seat back rest 12 is in an upright position.

Figure 2:
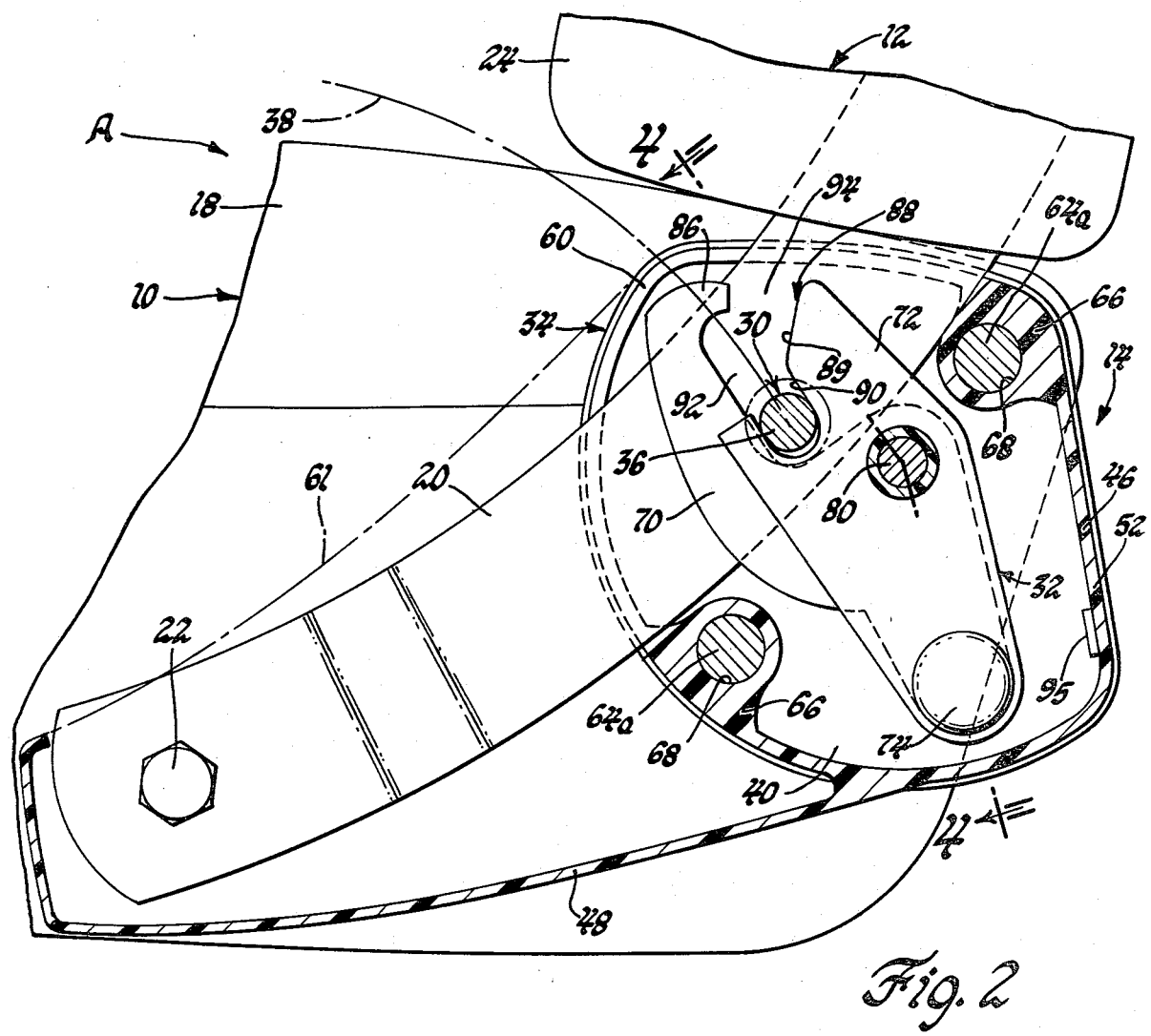
FIG. 2 is an enlarged view of FIG. 1, with portions shown in section.
Figure 4:
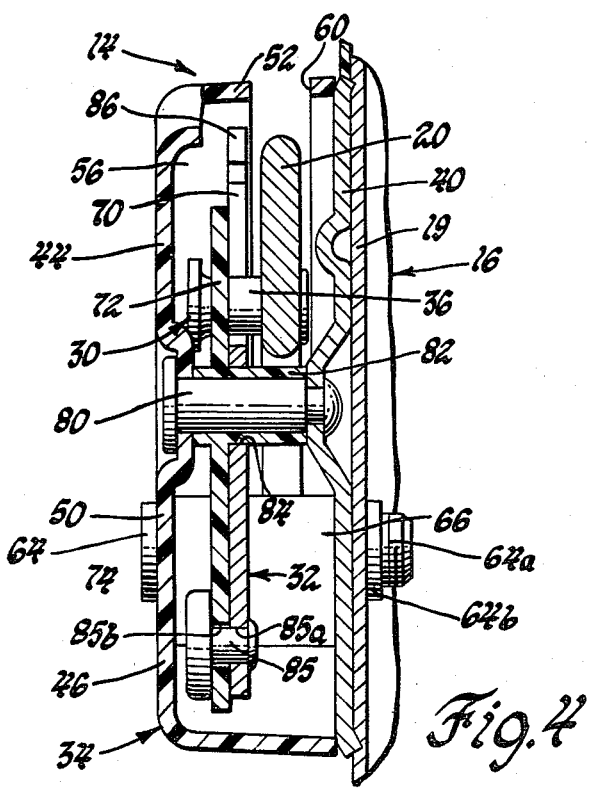
FIG. 4 is a sectional view taken approximately along lines 4—4 of FIG. 2.

The housing means 34 includes a slot 60 in its upper end for receiving the hinge arm 20 and the striker pin 36. As best shown in FIGS. 2 and 4, the slot 60 is through the upper end of the circumferentially extending wall 52 of the cup shaped portion 46 as well as the boot portion along its upper side 61. The housing means 34 is adapted to be secured to the side 19 of the seat frame 16 by a pair of fastener means 64. To this end, the cup shaped portion 46 of the housing means 34 includes a pair of spaced bosses 66 having openings 68 therethrough. The fastener means 64 comprises bolts 64a which extend through the openings 68 and through aligned openings (not shown) in base plate 40 and side 19 of the seat frame 16 and nuts 64b for securing the bolts 64a in place. As viewed in FIG. 2, the upper boss 66 is located adjacent the bottom of the slot 60 and serves as a stop or abutment means by engaging the hinge arm 20 in its fully upright position to position the same. The provision of a plastic stop integral with the housing 34 eliminates the need for a separate stop means for engaging the seat back rest 12 in its fully upright position and eliminates rattling noise due to no metal to metal contact.

The housing means 34 also pivotally supports the latch lever means 32. The latch lever means 32 comprises a first flat latch lever 70 made from a suitable metallic material, an anti-rattle second flat latch lever 72 made from a suitable plastic material and attached to the latch lever 70 and a weight 74 attached to the latch levers 70 and 72 adjacent their lower end, as viewed in the drawings. The latch levers 70 and 72 are pivotally supported intermediate their ends for movement in opposite directions by a pivot pin means 80. To this end, the pivot pin means 80 is carried by the housing 34 and extends through the compartment 56 and the plastic member 72 includes a hub portion 82 intermediate its ends which is rotatably supported on the pivot pin means 80. The hub 82 extends through an opening 84 in the latch lever 70 and has an axial length slightly less than the distance between the outer wall 44 and the support plate 40 so as to allow free rotational movement, but yet confine that movement in a single plane. The latch levers 70 and 72 are held in back to back engagement with each other and secured together for movement in unison by a staked over rivet 85 integral with the weight 74. The rivet 85 extends through aligned openings 85a and 85b in the levers 70 and 72, respectively.

The latch member 70 adjacent its upper end is hook shaped as indicated at 86 and the plastic member 72 adjacent its upper end has a configuration so as to provide a cam follower means 88 having a first cam follower surface 89 and a second cam follower surface 90. The cam follower surfaces 89 and 90 are spaced from the hook shaped end 86 and define therewith an elongated first slot portion 92 and a second slot portion 94. The slot portion 94 extends at an obtuse included angle with the slot portion 92. The latch means 32 is gravity biased toward the position shown in FIG. 3. That is, the weight of the lever means 32 is such that the lever means 32 wants to rotate counterclockwise about the axis of the pivot pin means 80. Its counterclockwise rotation is limited by a stop 95 formed integral with the circumferentially extending wall 52 of the housing means 34.

The latch lever means 70 is normally held against its gravity biasing force in a latched position, as shown in FIG. 2, when the seat back 12 is in its fully upright position. The latch lever means 32 is held in this position by the striker pin 36.

Figure 3:
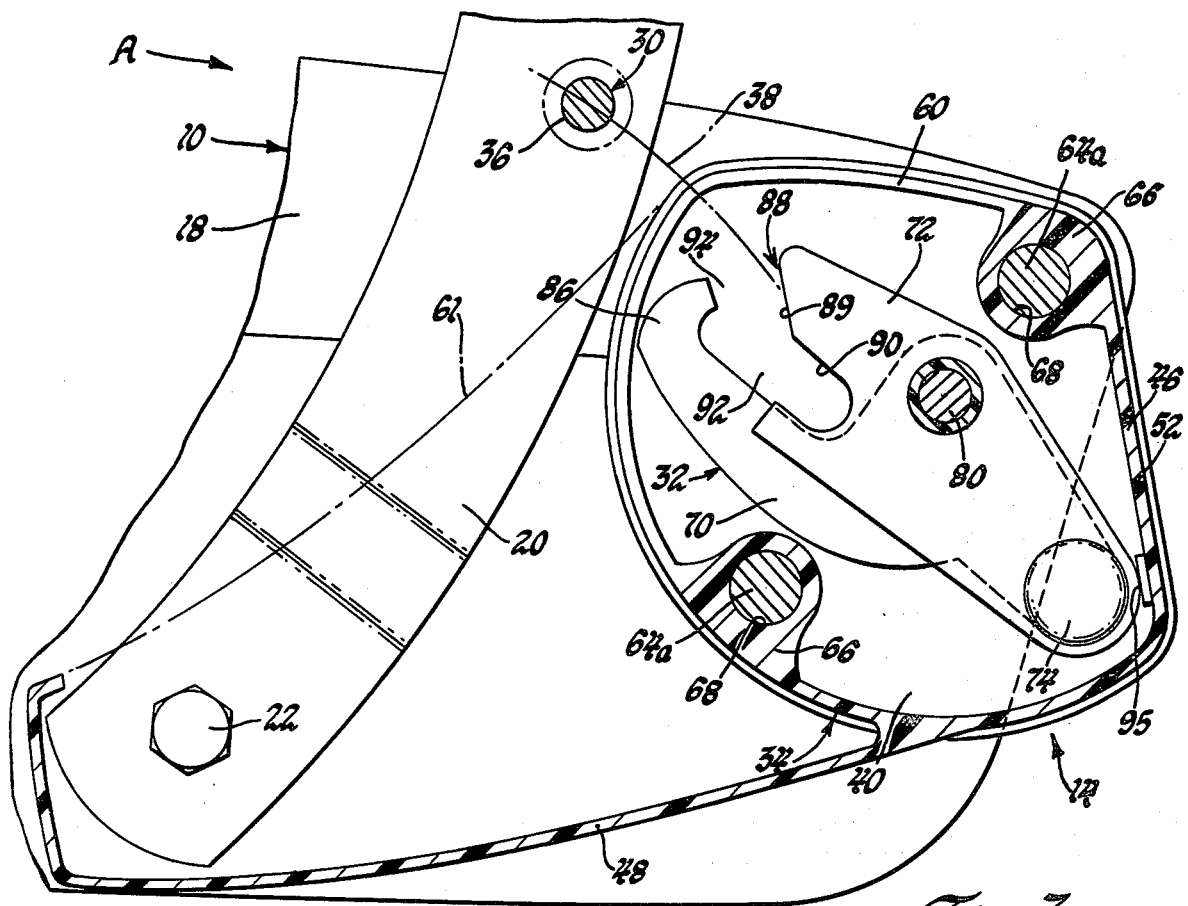
FIG. 3 is a view similar to that shown in FIG. 2, but with various parts shown in different positions.

In operation, when the seat back rest is in its normal fully upright position, as shown in FIG. 2, the striker pin 36 holds the latch lever means 32 in its latched position in opposition to its gravity bias. Should the operator desire to move the seat back 12 from its fully upright position toward its forward folded position, as shown by the phantom lines in FIG. 1, he need merely tilt the seat back 12 slowly forwardly. As this movement occurs, the striker pin 36 will ride along the cam follower surface 90 in the slot portion 92 until the striker 30 clears the cam follower surface 90. When this occurs, the latch lever means 32 will begin to rotate in a counterclockwise direction due to its gravity bias and allow the striker pin 36 to move through the slot portion 94 as the seat unit 12 is tilted further forwardly until it clears the slot portion 94. The latch means 32 will then further rotate counterclockwise to its position, as shown in FIG. 3. In this position the cam follower surface 89 will be disposed within the arcuate path of movement of the striker pin 36.

Upon return of the seat back unit 12 from its forward position to its fully upright position, the reverse movement will occur. As the seat back unit 12 is moved toward its fully upright position, the striker pin 36 will engage cam follower surface 89 and cam and rotate the lever means 32 in a clockwise direction until the striker pin 36 is received within the slot portion 92 during which it will engage the cam follower surface 90 to position the latch lever means 32 in a latched position.

The latch mechanism 14 is also operable to maintain the seat back unit 12 in a latched upright position when the vehicle is subjected to rapid deceleration forces, such as occurs upon rapidly applying the brakes. When such a condition occurs, the seat back 12 will tend to want to tilt forwardly. However, this movement is prevented due to the fact that the lever means 32 in response to inertia forces will remain in the position shown in FIG. 2 and thus, the striker pin 30 will be caught by the hook end portion 86 of the latch member 70 to prevent further forward tilting movement of the seat back 12. When the rapid deceleration forces are over, the seat back 12 can then be returned to its fully upright position.

An important feature of the present invention is that the latching mechanism 14 is operable even if the seat back 12 is not moved to its fully upright position. This is achieved as a result of the configuration of the latch means 32. The provision of the elongated slot 92 and cam follower surface 90 allows the seat back unit 12 to be positioned forwardly of its fully upright position while the striker pin 36 still maintains the latch means 32 in its latched position. In the illustrated embodiment, it is contemplated that the seat back 12 can be located as much as seven degrees forward from its fully upright position and still maintain the latch means 32 operatively latched. Thus, in the event that cargo is contained in the cargo area behind the seat which prevents the seat back 12 from being moved to its fully upright position, the latch means 32 will still be maintained operative to insure that the latch member 70 is engaged by the striker pin 36 during rapid deceleration of the vehicle. By maintaining the latch means 32 in its latched position at all times insures that the seat back unit 12 can never be moved forwardly during rapid deceleration of the vehicle.

The use of the plastic member 72 to provide the cam surfaces 89 and 90 for engaging the striker pin 36 provides an anti-rattle feature in that the metal striker pin 36 will not be engaging a metallic surface. This minimizes any rattling noise.

From the foregoing detailed description, it can be seen that a novel inertia responsive latching mechanism has been provided for tiltable vehicle seats and that the invention is especially useful with tiltable seats having a cargo area immediately behind them.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A seat assembly for an automotive vehicle comprising:
   a seat which is adapted to be mounted to vehicle structure,
   a seat back which is pivotally supported for movement between a fully upright position and a forward position in which it generally overlies said seat,
   said seat back having a striker means extending transversely of its side which is movable in unison with the back rest through a given arcuate path,
   an inertia responsive latch means pivotally supported intermediate its ends for movement in opposite directions,
   said latch means having a latch at one end and first and second cam follower surfaces spaced from said latch and respectively defining with said latch a slot means having first and second slot portions, said second slot portion extending at an obtuse included angle with said first slot portion,
   said latch means being gravity biased toward an unlatched position in which said latch is out of the path of movement of the striker means,
   said striker means sequentially engaging said first cam follower surface and then said second cam follower surface of said latch means to respectively cam and hold the latter against its gravity bias in a latched position in which the latch is disposed within the path of movement of the striker means when the seat back is returned to an upright position,
   said second cam follower surface extending along the path of movement of said striker means an extent such that the striker means will hold the latch means in its latched position when the seat back is in its fully upright position as well as when the seat back is in an upright position slightly forwardly of its fully upright position due to an inability to be moved to its fully upright position,
   said latch means being movable by gravity toward its unlatched position upon said striker means disengaging the second cam follower surface as the seat back is slowly pivoted toward its forward position, and
   said latch means, due to inertia forces, remaining in its latched position where the latch is engaged by the striker means, even though the latter is disengaged from the second cam follower surface, when the seat assembly is subjected to rapid deceleration forces so that further forward movement of the seat back is prevented.

2. A seat assembly for an automotive vehicle comprising:
   a seat which is adapted to be mounted to vehicle structure,
   a seat back which is pivotally supported for movement between a fully upright position and a forward position in which it generally overlies said seat,
   said seat back having a striker means extending transversely of its side which is movable in unison with the back rest through a given arcuate path,
   an inertia responsive latch means pivotally supported intermediate its ends for movement in opposite directions,
   said latch means comprising a first metallic latch lever having a hook shaped end and a second plastic latch lever secured to said first latch lever and having first and second cam follower surfaces spaced from the hook shaped end of said first latch lever,
   said latch means being gravity biased toward an unlatched position in which said hook shaped end of said first latch lever is out of the path of movement of the striker means, said striker means engaging said first cam follower surface and then said second cam follower surface of said second latch lever to respectively cam and hold the latch means against its gravity bias in a latched position in which the hook shaped end of the first latch lever is disposed within the path of movement of the striker means when the seat back is returned toward an upright position, said striker means directly engaging only said second plastic latch lever when the seat back is in an upright position to minimize rattling noise, said second cam follower surface extending along the path of movement of said striker means an extent such that the striker means will hold the latch means in its latched position when the seat back is in its fully upright position as well as when the seat back is in an upright position slightly forwardly of its fully upright position due to an inability to be moved to its fully upright position, said latch means being movable by gravity toward its unlatched position upon said striker means disengaging the second cam follower surface as the seat back is slowly pivoted toward its forward position, and said latch means, due to inertia forces, remaining in its latched position where the hook shaped end of the first latch lever is engageable with the striker means, when the seat assembly is subjected to rapid deceleration forces so that further forward movement of the seat back is prevented after having moved slightly forwardly of its upright position.

3. A seat assembly for an automotive vehicle comprising:

a seat including a frame which is adapted to be mounted to vehicle structure, a seat back rest carried by hinge arms which are pivotally supported by said seat for movement between a fully upright position and a forward position in which the seat back rest generally overlies said seat, at least one of said hinge arms having a striker means extending transversely of its side which is movable in unison with said hinge arm through a given arcuate path, a housing supported by said frame of said seat and having plastic abutment means thereon for engaging said one hinge arm to position the latter in its fully upright position and minimize rattling, an inertia responsive latch means pivotally supported intermediate its ends by said seat for movement in opposite directions, said latch means having a latch at one end and first and second cam follower surfaces spaced from the latch and respectively defining with said latch a slot means having first and second slot portions, said second slot portion extending at an obtuse included angle with said first slot portion, said latch means being gravity biased toward an unlatched position in which said latch is out of the path of movement of the striker means and said first cam follower surface is disposed in the path of movement of said striker means, said striker means sequentially engaging said first cam follower surface and then said second cam follower surface to respectively cam and hold the latch means against its gravity bias in a latched position in which the latch is disposed within the path of movement of the striker means when the seat back rest and hinge arms are returned toward an upright position, said second cam follower surface extending along the path of movement of said striker means an extent such that the striker means will hold the latch means in its latched position when the seat back is in its fully upright position as well as when the seat back is in an upright position slightly forwardly of its fully upright position due to an inability to be moved to its fully upright position, said latch means being movable by gravity toward its unlatched position upon said striker means disengaging the second cam follower surface as the seat back is slowly pivoted toward its forward position, and said latch means, due to inertia forces, remaining in its latched position where the latch is engageable with the striker means when the seat assembly is subjected to rapid deceleration forces so that further forward movement of the seat back is prevented after having moved slightly forwardly of its upright position.

4. A seat assembly for an automotive vehicle comprising:

a seat unit which is adapted to be mounted to vehicle structure, a seat back unit which is pivotally supported for movement between a fully upright position and a forward position in which it generally overlies said seat, said seat back having a striker means extending transversely of its side which is movable in unison with the back rest through a given arcuate path, a housing means carried by said seat unit and having a plastic abutment means which serves as a stop for said seat back unit when the latter is moved to its fully upright position to minimize rattling, an inertia responsive latch means pivotally supported intermediate its ends by said housing for movement in opposite directions, said latch means having a latch at one end and first and second cam follower surfaces spaced from said latch and respectively defining with said latch a slot means having first and second slot portions, said second slot portion extending at an obtuse included angle with said first slot portion, said latch means being gravity biased toward an unlatched position in which said latch is out of the path of movement of the striker means and said first slot portion and first cam follower are disposed within the path of movement of said striker means, said striker means sequentially engaging said first and second cam follower surfaces of said latch means to respectively cam and hold the latter against its gravity bias in a latched position in which the latch is disposed within the path of movement of the striker means when the seat back is returned to an upright position, said second cam follower surface extending along the path of movement of said striker an extent such that the striker means will hold the latch means in its latched position when the seat back is in its fully upright position as well as when the seat back is in an upright position slightly forwardly of its fully upright position due to an inability to be moved to its fully upright position, said latch means being movable by gravity toward its unlatched position upon said striker means disengaging the second cam follower surface as the seat back is slowly pivoted toward its forward position, and said latch means, due to inertia forces, remaining in its latched position where the latch is engaged by the striker means, even though the latter is disengaged from the second cam follower surface, when the seat assembly is subjected to rapid deceleration forces so that further forward movement of the seat back is prevented.

* * * * *